(12) United States Patent
Cheng et al.

(10) Patent No.: US 10,635,821 B2
(45) Date of Patent: Apr. 28, 2020

(54) METHOD AND APPARATUS FOR LAUNCHING A DEVICE

(71) Applicant: Baidu USA LLC, Sunnyvale, CA (US)

(72) Inventors: Yueqiang Cheng, Sunnyvale, CA (US); Tao Wei, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 253 days.

(21) Appl. No.: 15/783,230

(22) Filed: Oct. 13, 2017

(65) Prior Publication Data

US 2019/0114431 A1   Apr. 18, 2019

(51) Int. Cl.
| | |
|---|---|
| G06F 9/4401 | (2018.01) |
| G06F 21/57 | (2013.01) |
| G06F 21/44 | (2013.01) |
| G06F 21/53 | (2013.01) |
| G06F 9/455 | (2018.01) |
| G06F 21/74 | (2013.01) |
| G06F 21/51 | (2013.01) |

(52) U.S. Cl.
CPC ........ *G06F 21/575* (2013.01); *G06F 9/45558* (2013.01); *G06F 21/44* (2013.01); *G06F 21/53* (2013.01); *G06F 9/4401* (2013.01); *G06F 21/51* (2013.01); *G06F 21/74* (2013.01); *G06F 2009/45575* (2013.01); *G06F 2009/45579* (2013.01); *G06F 2009/45587* (2013.01)

(58) Field of Classification Search
None
See application file for complete search history.

(56) References Cited

U.S. PATENT DOCUMENTS

2017/0161505 A1* 6/2017 Campagna .......... G06F 9/45558
2018/0285560 A1* 10/2018 Negi ....................... G06F 21/72

* cited by examiner

*Primary Examiner* — Paul Yen
(74) *Attorney, Agent, or Firm* — Seed IP Law Group LLP

(57) ABSTRACT

Embodiments of the present disclosure disclose a method and apparatus for launching a device. An embodiment of the method comprises: trusted launching the device and extending a trusted launch measurement to a platform configuration register of the trusted platform module, wherein the trusted launch measurement is an integrity measurement of the trusted launching of the device; loading a preset enclave and extending an enclave measurement to the platform configuration register, wherein the enclave measurement is an integrity measurement of the preset enclave; initiating a remote attestation of the preset enclave to an authentication server based on the trusted platform module; in response to receiving remote attestation pass information sent from the authenticating server, detecting an operation of loading another enclave, wherein the another enclave is an enclave different from the preset enclave among enclaves of the device; in response to the operation of loading the another enclave being detected, performing local attestation of the another enclave based on the preset enclave. This embodiment implements remote attestation of an enclave in the device.

17 Claims, 7 Drawing Sheets

METHOD AND APPARATUS FOR LAUNCHING A DEVICE

TECHNICAL FIELD

Embodiments of the present disclosure relate to the field of computer technologies, specifically to the field of information security, and more particularly to a method and an apparatus for launching a device.

BACKGROUND

An operating system (OS) is a computer program for managing and controlling computer hardware and software resources, which is the most underlying system software directly running on an electronic device; any other software must be supported by the operating system to run. Generally, during a power-on launching process, the electronic device will generally load and launch the operating system first, and then applications and system services, etc.

SUMMARY

Embodiments of the present disclosure provide a method and an apparatus for launching a device.

In a first aspect, an embodiment of the present disclosure provides a method for launching a device, the device being configured with a trusted platform module, the method comprising: trusted launching the device and extending a trusted launch measurement to a platform configuration register of the trusted platform module, wherein the trusted launch measurement is an integrity measurement of the trusted launching of the device; loading a preset enclave and extending an enclave measurement to the platform configuration register, wherein the enclave measurement is an integrity measurement of the preset enclave; initiating a remote attestation of the preset enclave to an authentication server based on the trusted platform module; in response to receiving remote attestation pass information sent from the authenticating server, detecting an operation of loading another enclave, wherein the another enclave is an enclave different from the preset enclave among enclaves of the device; in response to the operation of loading the another enclave being detected, performing local attestation of the another enclave based on the preset enclave.

In some embodiments, the trusted launch measurement includes a boot loader measurement and a kernel measurement; and the trusted launching the device and extending a trusted launch measurement to a platform configuration register of the trusted platform module comprises: loading and executing a kernel boot loader, and extending the boot loader measurement to the platform configuration register of the trusted platform module, wherein the boot loader measurement is an integrity measurement of the kernel boot loader; loading and launching a kernel of an operating system installed in the device based on the kernel boot loader, and extending the kernel measurement to the platform configuration register, wherein the kernel measurement is an integrity measurement of the kernel.

In some embodiments, the loading a preset enclave and extending an enclave measurement to the platform configuration register comprises: loading the preset enclave based on the kernel and extending the enclave measurement to the platform configuration register.

In some embodiments, after loading the preset enclave based on the kernel and extending the enclave measurement to the platform configuration register, the method further comprises: loading and launching a kernel module of the operating system based on the kernel and extending a kernel module measurement to the platform configuration register, wherein the kernel module measurement is an integrity measurement of the kernel module.

In some embodiments, the trusted platform module is provided with a module identifier; and the initiating a remote attestation of the preset enclave to an authentication server based on the trusted platform module comprises: sending authentication information to the authentication server, wherein the authentication server performs the remote attestation of the preset enclave based on the received authentication information, the authentication information including: the module identifier of the trusted platform module, the trusted launch measurement, and the enclave measurement.

In some embodiments, the device is further provided with an input/output memory management unit; and before loading the preset enclave based on the kernel and extending the enclave measurement to the platform configuration register, the method further comprises: setting the input/output memory management unit based on the kernel to forbid a direct memory access operation.

In some embodiments, the trusted launch measurement further includes a virtual machine monitor measurement; and the loading and launching a kernel of an operating system installed in the device based on the kernel boot loader and extending the kernel measurement to the platform configuration register comprises: loading and launching a virtual machine monitor installed in the device based on the kernel boot loader, and extending the virtual machine monitor measurement to the platform configuration register, wherein the virtual machine monitor measurement is an integrity measurement of the virtual machine monitor; and loading and launching the kernel of the operating system installed in the device based on the virtual machine monitor and extending the kernel measurement to the platform configuration register.

In some embodiments, the method further comprises: in response to passing the local attestation of the another enclave based on the preset enclave, sending local attestation pass information to the authentication server, and executing executable code in the another enclave, wherein the authentication server determines that the remote attestation of the another enclave passes in response to receiving the local attestation pass information.

In a second aspect, an embodiment of the present disclosure provides an apparatus for launching a device, the device being configured with a trusted platform module, the apparatus comprising: a trusted launching unit configured to trusted launch the device and extend a trusted launch measurement to a platform configuration register of the trusted platform module, wherein the trusted launch measurement is an integrity measurement of the trusted launching of the device; an enclave loading unit configured to load a preset enclave and extend an enclave measurement to the platform configuration register, wherein the enclave measurement is an integrity measurement of the preset enclave; a remote attestation unit configured to initiate a remote attestation of the preset enclave to an authentication server based on the trusted platform module; a detecting unit configured to in response to receiving remote attestation pass information sent from the authenticating server, detect an operation of loading another enclave, wherein the another enclave is an enclave different from the preset enclave among enclaves of the device; and a local attestation unit configured to in response to the operation of loading the another enclave being detected, perform local attestation of the another enclave based on the preset enclave.

In some embodiments, the trusted launch measurement includes a boot loader measurement and a kernel measurement; and the trusted launching unit comprises: a kernel boot loader launching module configured to load and execute a kernel boot loader and extend the boot loader measurement to the platform configuration register of the trusted platform module, wherein the boot loader measurement is an integrity measurement of the kernel boot loader; and a kernel launching module configured to load and launch a kernel of the operating system installed in the device based on the kernel boot loader and extend the kernel measurement to the platform configuration register, wherein the kernel measurement is an integrity measurement of the kernel.

In some embodiments, the enclave loading unit is further configured to: load the preset enclave based on the kernel and extend the enclave measurement to the platform configuration register.

In some embodiments, the apparatus further comprises: a kernel module launching unit configured to: load and launch a kernel module of the operating system based on the kernel and extend a kernel module measurement to the platform configuration register, wherein the kernel module measurement is an integrity measurement of the kernel module.

In some embodiments, the trusted platform module is provided with a module identifier; and the remote attestation unit is further configured to: send authentication information to the authentication server, wherein the authentication server performs the remote attestation of the preset enclave based on the received authentication information, the authentication information including: the module identifier of the trusted platform module, the trusted launch measurement, and the enclave measurement.

In some embodiments, the device is further provided with an input/output memory management unit; and the apparatus further comprises: a setting unit configured to set the input/output memory management unit based on the kernel to forbid a direct memory access operation.

In some embodiments, the trusted launch measurement further includes a virtual machine monitor measurement; and the kernel boot loader launching module is further configured to: load and launch a virtual machine monitor installed in the device based on the kernel boot loader and extend the virtual machine monitor measurement to the platform configuration register, wherein the virtual machine monitor measurement is an integrity measurement of the virtual machine monitor; and load and launch the kernel of the operating system installed in the device based on the virtual machine monitor and extend the kernel measurement to the platform configuration register.

In some embodiments, the apparatus further comprises: an executing unit configured to in response to passing the local attestation of the another enclave based on the preset enclave, send local attestation pass information to the authentication server, and execute executable code in the another enclave, wherein the authentication server determines that the remote attestation of the another enclave passes in response to receiving the local attestation pass information.

In a third aspect, an embodiment of the present application provides an electronic device, the electronic device comprising: one or more processors; a storage storing one or more programs which, when being executed by the one or more processors, cause the one or more processors to implement the method described according to any embodiment in the first aspect.

In a fourth aspect, an embodiment of the present application provides a non-transitory computer readable storage medium having a computer program embodied thereon, wherein the computer program, when being executed by a processor, causes the processor to implement the method described according to any embodiment in the first aspect.

With the method and apparatus for launching a device provided by the embodiments of the present disclosure, by creating a trusted running environment through trusted launching the device, before the operating system launch other services, the first enclave is securely launched first and subjected to a TPM (Trusted Platform Module)-based remote attestation. In this way, even the operating system and other running environments are hacked later, the first launched enclave is still attested, and the remote attestation of subsequent enclaves may be finalized through the first enclave performing local attestation of the subsequent enclaves. Due to adopting the TPM-based remote attestation instead of the Intel SGX-based remote attestation, the remote attestation process of the present disclosure will have a high security, independent of remote attestation infrastructure of the Intel SGX; in addition, most electronic devices are provided with a trusted platform module, independent of new hardware functions, such that the remote attestation process has a universality.

BRIEF DESCRIPTION OF THE DRAWINGS

Other features, objectives and advantages of the present application will become more apparent through reading the detailed description of non-limiting embodiments with reference to the accompanying drawings.

DETAILED DESCRIPTION OF THE PREFERRED EMBODIMENTS

Hereinafter, the present disclosure will be described in further detail with reference to the accompanying drawings and embodiments. It will be appreciated that the preferred embodiments described herein are only for explaining the present disclosure, not for limiting the present disclosure. In addition, it should also be noted that for the ease of description, the drawings only illustrate those parts related to the present disclosure.

It should be noted that without conflict, the embodiments in the present disclosure and features in the embodiments may be combined mutually. Hereinafter, the present disclosure will be illustrated in detail with reference to the accompanying drawings in conjunction with the embodiments.

Figure 1:
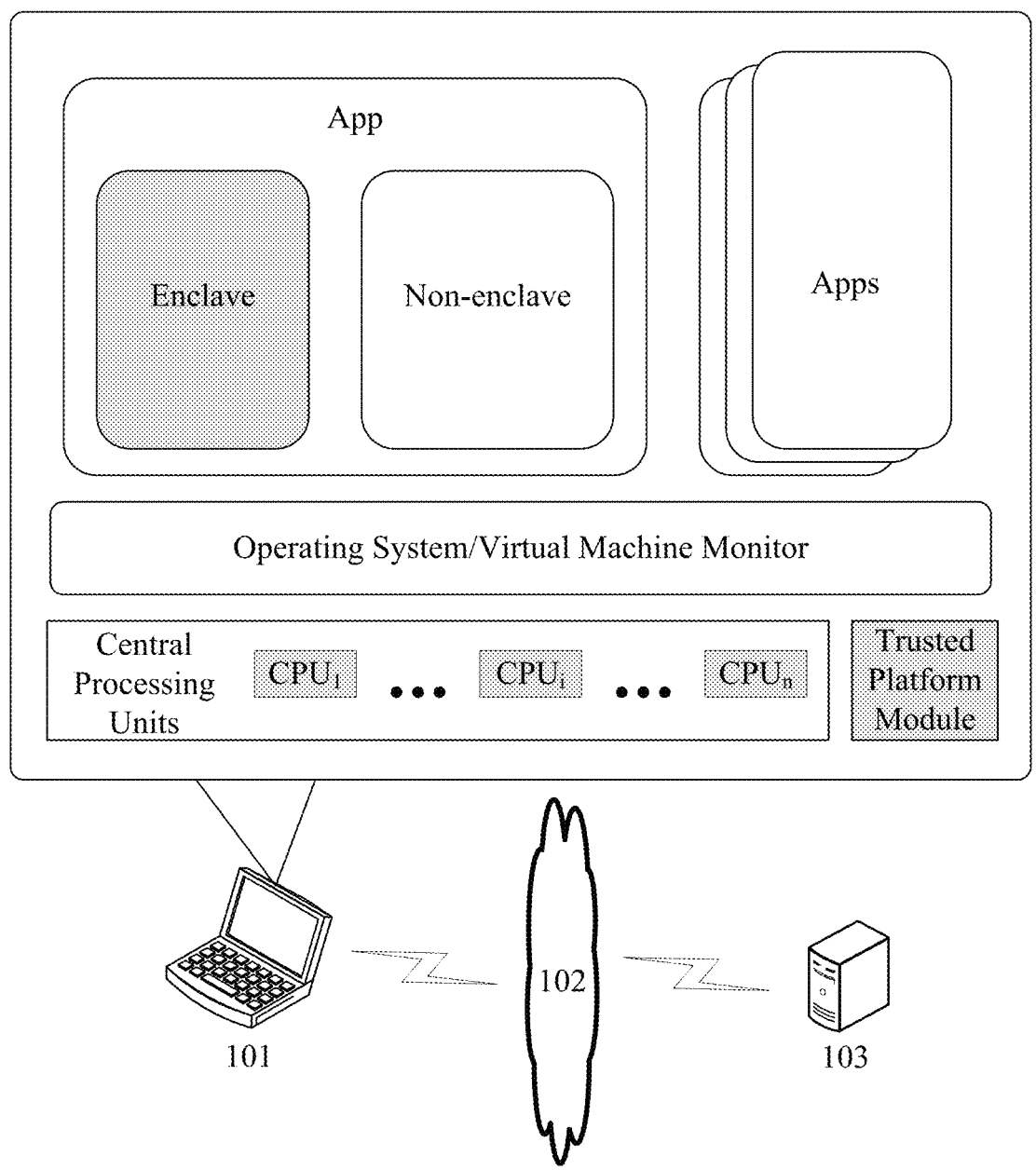
FIG. 1 is an exemplary system architecture diagram in which the present disclosure may be applied.

FIG. 1 shows an exemplary system architecture 100 in which the embodiments of a method for launching a device or an apparatus for launching a device of the present disclosure may be applied.

As illustrated in FIG. 1, the system architecture 100 may comprise an electronic device 101, a network 102, and a server 103. The network 102 is a medium for providing a communication link between the electronic device 101 and the server 103. The network 102 may include various kinds of connection types, e.g., a wired communication link, a wireless communication link, or an optical cable, etc.

The electronic device 101 may be various kinds of electronic devices that support the Intel SGX (Intel Software Guard Extensions) technology, including, but not limited to, a smart phone, a tablet computer, a laptop portable computer, and a desktop computer, etc.

The electronic device 101 may include central processors $CPU_1, \ldots, CPU_i, \ldots, CPU_n$, and a Trusted Platform Module (TPM). Here, n is a positive integer. For example, when n is 1, the electronic device 101 may only have one processor, i.e., $CPU_1$; and when n is 2, the electronic device 101 may have 2 processors, i.e., $CPU_1$ and $CPU_2$.

An operating system (OS) or a virtual machine monitor (VMM) may be installed in the electronic device 101.

At least one application (APP) may also be installed in the electronic device 101, wherein some applications may include two parts: an enclave and a non-enclave.

The grey parts in the electronic device 101 are trusted parts, including the central processors $CPU_1, \ldots, CPU_i, \ldots, CPU_n$, the trusted platform module, and the enclave parts of various applications.

The server 103 may be a server that provides various kinds of services, e.g., a background server that provides supports to the enclaves and the trusted platform module in the electronic device 101. The background server may perform processing such as analysis to data such as received authentication information, etc. and report back a processing result (e.g., remote attestation pass information) to the electronic device.

It needs to be noted that the method for launching a device provided by an embodiment of the present disclosure is generally executed by the electronic device 101; correspondingly, the apparatus for launching a device is generally arranged in the electronic device 101.

It should be understood that the numbers of electronic devices, networks, and servers in FIG. 1 are only schematic. Any numbers of electronic devices, networks, and servers may be provided according to needs of implementation.

Figure 2:
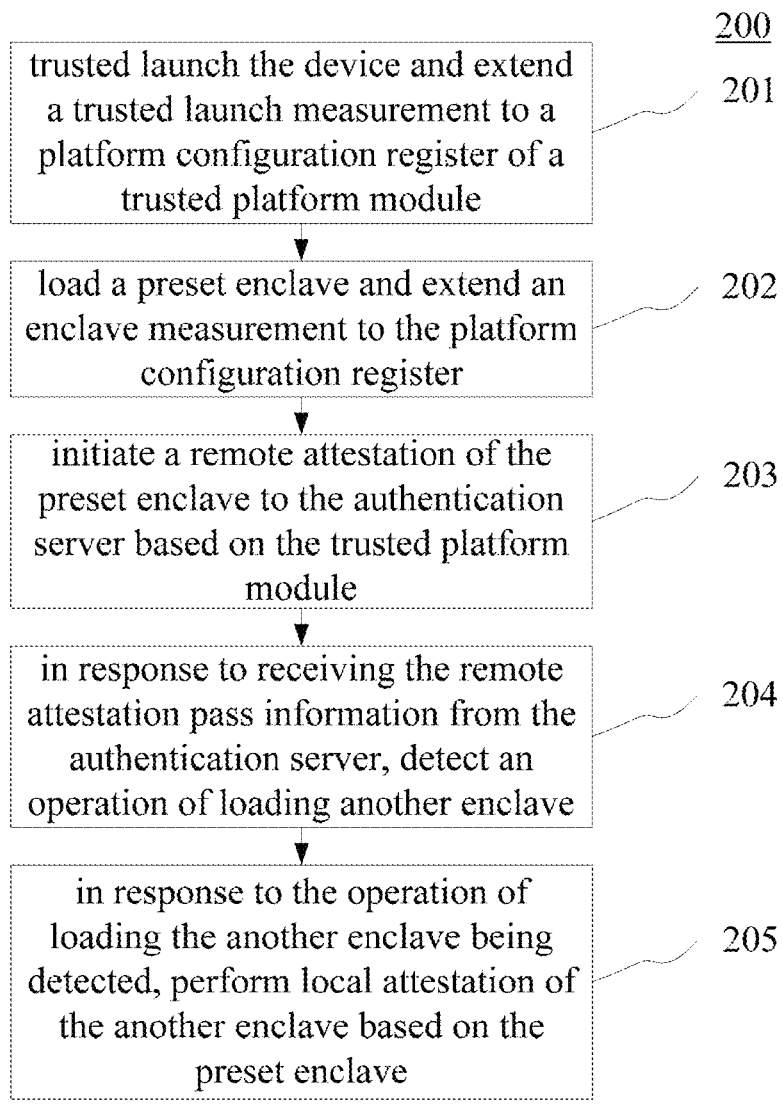
FIG. 2 is a flow diagram of an embodiment of a method for launching a device according to the present disclosure.

Continue referring to FIG. 2, which shows a flow 200 of an embodiment of a method for launching a device according to the present disclosure. The method for launching a device comprises steps of:

Step 201: trusted launching the device and extending a trusted launch measurement to a platform configuration register of a trusted platform module.

The Intel SGX technology is a novel hardware-based trusted computing technology. Through secure extension of a central processing unit (CPU), the Intel SGX technology encapsulates secure operations of legal software in an enclave to guard it from malware attacks, such that neither privileged nor unprivileged software may access the enclave.

A building environment (including an operating system, other applications, and system services, etc.) for an enclave is usually untrusted. To ensure information security during an interaction process with the server, the server has to perform a remote attestation of the enclave before the interaction between the enclave and the server, and only the enclave passing the remote attestation may interact with the server. Currently, an SGX-based remote attestation is mainly adopted for remote attestation of the enclave in an electronic device.

In this embodiment, the electronic device (e.g., the electronic device 101 shown in FIG. 1) on which the method for launching a device runs may trusted launch the device after the electronic device is power-on and extend a trusted launch measurement to a platform configuration register of a trusted platform module, wherein the trusted launch measurement is an integrity measurement of trusted launching the device.

Here, the electronic device may support the Intel SGX technology and be provided with a trusted platform module, wherein the trusted platform module refers to a TPM security chip in compliance with TPM (Trusted Platform Module) standards. The TPM security chip may implement functions such as integrity measurement, encrypted storage of sensitive data, remote attestation, authorized access to internal resources, and encrypted transmission of data, etc.

Figure 3:
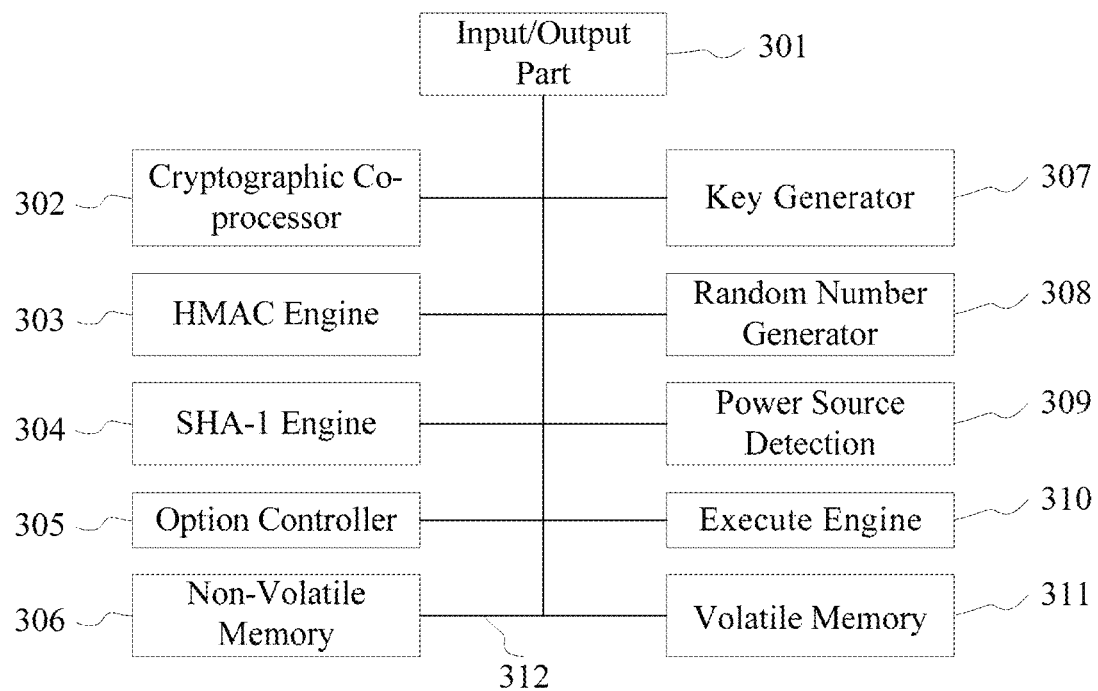
FIG. 3 is a structural schematic diagram of an embodiment of a TPM security chip according to the present disclosure.

Please refer to FIG. 3, which is a structural schematic diagram of an embodiment of the TPM security chip. As shown in FIG. 3, the TPM security chip may include an input/output part 301, a cryptographic co-processor 302, an HMAC engine 303, an SHA-1 engine 304, an option controller 305, a non-volatile memory 306, a key generator 307, a random number generator 308, a power source detection 309, an execute engine 310, a volatile memory 311, and a communication bus 312, etc., wherein:

The input/output (I/O) part 301 is for processing data streams on a communication bus, finalizing coding and decoding operations adapted for internal and external bus communication protocols, and sending the data streams to an appropriate component.

The cryptographic co-processor 302 is an RSA engine, which manages generation and secure storage of keys, and provides functions of digital signature and data encryption and decryption.

The HMAC (keyed-Hash Message Authentication Code) engine 303 provides a computing function, but has no responsibility of managing data transmission or command transmission. It may detect situations where the data and instructions have errors or are tampered.

The SHA-1 (Secure Hash Algorithm-1) engine 304 is responsible for performing basic SHA-1 operations.

The option controller (Opt-Ln) 305 sets functional options of the TPM by changing a variable flag bit by or authorized by the owner of the TPM.

The non-volatile memory 306: some data have to be still saved after system power-off, while data stored in the non-volatile memory 306 will not be lost even the TPM is not power-on; for example, the non-volatile memory 306 may be used for storing an EK (Endorsement Key) and an SRK (Storage Root Key).

The key generator 307 generates keys for various cryptographic operations using random data generated by the random number generator 308.

The random number generator (RNG) 308 is for generating random data, e.g., for generating a Nonce. Here, Nonce refers to Number used once or Number once in the cryptology, i.e., Nonce is an arbitrary or non-repetitive random numerical value that is only used once.

The power source detection 309 senses changes of power source states during platform initialization or reboot so as to perform operations such as power-on detection.

The execute engine 310 is for executing commands received by the TPM and actually finalizing application functions provisioned by the TPM to the external, e.g., operations of TPM initialization and measurement.

The volatile memory 311: relative to the non-volatile memory, data stored in the volatile memory will be discarded or reset upon system power-off or reboot.

The TPM security chip further includes at least 16 platform configuration registers (PCRs). The PCR is for storing platform configuration measurement values. These measurement values may be SHA-1 values of the application environments running on the platform. The PCR cannot perform write operations directly. The process of storing data is referred to as Extend. During launch of the system, a launch log is saved in the PCR. Each time after the system is measured, the measurement value and the PCR are subjected to the following processing: PCR[N+1]=SHA-1(PCR[N]+Value), where the value of Value is the current measurement value, PCR[N] is the $N^{th}$ evaluation of the PCR, SHA-1 (PCR[N]+Value) refers to computing a secure hash value for the $N^{th}$ evaluation and the current measurement value using a secure hash algorithm, and PCR[N+1] is an evaluation after extending the current measurement value to the PCR. In this way, the PCR saves the secure hash value for the current PCR value and each measurement value, and this secure hash value may be used for environment measurement. The PCR may be implemented with a non-volatile memory or volatile memory.

The TPM security chip may also store an AIK (Attestation Identity Key). In the remote attestation, it is important to determine on interacting with an available TPM security chip; during an attestation process, an endorsement key may be used; however, use of the endorsement key possibly causes privacy leakage of the user (because the endorsement key is unique and fixed); therefore, the AIK may be used instead. The AIK must be persistently unchanged; in practice, the AIK may be stored as a key field into a persistently unchanged storage device external to the TPM security chip, or the AIK may be persistently and unchangeably stored in a non-volatile memory 306 inside the TPM security chip.

In this embodiment, because the electronic device supports the Intel SGX technology and is configured with a TPM security chip, a TXT (Trusted Execute Technology) may be employed to implement trusted launch of the electronic device. A core of the TXT is to implement trusted computing through the TPM security chip. The TPM is a trusted root of the trusted computing platform, which protects the electronic device from an underlying layer of hardware.

Here, the trusted launching of the electronic device may be implemented by introducing a TPM security chip, establishing a trusted root from the most original physical security perspective, and then establishing a trusted chain. Starting from the trusted root to the hardware platform, to the operating system, and then to the application system, one level is measured and attested by another level, and the trust is extended level by level till the entire computer system.

In some optional implementations of the present embodiment, the device may be trusted launched statically based on an SRTM (Static Root of Trust for Measurement), and the trusted launch measurement is extended to the platform configuration register of the trusted platform module. An RTM (Root of Trust for Measurement) is a trusted third party added in the electronic device, which is capable of performing an internally reliable integrity measurement. The RTM is an assumption of an axiom nature, and security mechanisms of the trusted computing are all built on this assumption. The SRTM (also referred to as a CRTM (Core Root of Trust for Measurement), is a first segment of code executed during the process of system launching; the first segment of code initializes a trusted launch order, executes the initial trusted measurement, and then boots the trusted platform module to start work. The SRTM resides in a flash memory; it must be guaranteed not to be modified or bypassed; otherwise, system security cannot be guaranteed. Upon power-on or reboot of the electronic device, boot sector code in a BIOS (Basic Input Output System) detects hardware and loads the operating system; this segment of code is referred to as the Static Root of Trust for Measurement or the Core Root of Trust for Measurement. As an example, a trusted launch process based on the Static Root of Trust for Measurement is provided below:

(1) loading and launching the Static Root of Trust for Measurement, performing an integrity measurement (e.g., using SHA-1) for the electronic device itself and the BIOS, extending the integrity measurement value to the platform configuration register of the trusted platform module, and then transferring a control right to the BIOS.

(2) the BIOS executing a usual operation, performing an integrity measurement for an optional ROM (Read-Only Memory), extending the integrity measurement value to the platform configuration register of the trusted platform module, and then transferring the control right to the optional ROM.

(3) The optional ROM executing a usual operation and then transferring the control right to the BIOS.

(4) The BIOS performing an integrity measurement for an OS Boot Loader (Operating System Boot Loader), extending the integrity measurement value to the platform configuration register of the trusted platform module, and then transferring the control right to the OS Boot Loader.

(5) the OS Boot Loader executing a usual operation, performing integrity measurement for the OS (Operating System) and extending the integrity measurement value to the platform configuration register of the trusted platform module, and then transferring the control right to the OS Kernel (Operating System Kernel).

In some optional implementations of this embodiment, the device may also be dynamically trusted launched based on a DRTM (Dynamic Root of Trust for Measurement), and extend the trusted launch measurement to the platform configuration register of the trusted platform module. The DRTM starts from a newly added security instruction issued by the CPU, which instructs the TPM security chip to start building a controlled and trusted execution environment. For example, in the Intel technologies, this newly added security instruction is referred to as "SENTER," while in the AMD technologies, this newly added security instruction is referred to as "SKINIT." In the case that the SRTM takes the un-modifiable part of the BIOS core as the Static Root of Trust for Measurement, the newly added CPU security instruction is the Dynamic Root of Trust for Measurement in the process of dynamically trusted launching the device.

In some optional implementations of this embodiment, the trusted launch measurement may comprise a boot loader measurement and a kernel measurement. In this way, the dynamically trusted launching the device based on a Dynamic Root of Trust for Measurement and extending the trusted launch measurement to the platform configuration register of the trusted platform module may proceed as follows:

First, a kernel boot loader may be loaded and executed, and a boot loader measurement is extended to the platform configuration register of the trusted platform module, wherein the boot loader measurement is an integrity measurement of the kernel boot loader.

Here, the kernel boot loader is for booting the OS kernel part installed in the electronic device.

Then, the kernel of the operating system installed in the device may be loaded and launched based on the kernel boot loader, and a kernel measurement is extended to the platform configuration register, wherein the kernel measurement is an integrity measurement of the kernel.

As an example, the process of configuring the kernel boot loader will be illustrated with an example of using Tboot as the kernel boot loader:

(1) obtaining the ownership of the trusted platform module and installing an appropriate SINIT ACM (Authenticated Code Module). Some hardware manufacturers have embedded the SINIT ACM in the BIOS. Some need to be downloaded and placed under the /boot directory. The ACM in use is listed in the "grub.conf" file.

(2) creating a LCP (Launch Control Policy). Tboot uses the Intel TXT and the LCP to build a secure operating environment.

(3) creating a VLP (Verified Launch Policy) file. The VLP file is used for verifying the kernel and the initial RAM (Random-Access Memory) disk (initrd) in the trusted launch.

(4) writing the created VLP file into a policy linked list file, and signing it.

(5) saving the policy linked list file in the TPM.

After the above configurations, the boot loader measurement and the kernel measurement may be extended to the platform configuration register of the trusted platform module, wherein the boot loader measurement is an integrity measurement during the process of loading and launching the kernel boot loader, and the kernel measurement is an integrity measurement during the process of loading and launching the kernel of the operating system installed in the electronic device, i.e., implementing storage of the trusted launch measurement to the platform configuration register of the trusted platform module. The trusted launch measurement may verify, during the remote attestation based on the trusted platform module, that the system is launched through the Tboot and that a designated kernel mirror is launched.

Step 202: loading a preset enclave and extending an enclave measurement to the platform configuration register.

In the present embodiment, the electronic device (e.g., the electronic device 101 shown in FIG. 1) may load a preset enclave after the device is launched and extend an enclave measurement to the platform configuration register, wherein the enclave measurement is an integrity measurement of the preset enclave.

In the present embodiment, the electronic device (e.g., the electronic device 101 shown in FIG. 1) may load content stored in the preset enclave into a memory or cache, then perform an integrity measurement for the loaded preset enclave to obtain an enclave measurement, and then extend the obtained enclave measurement to the platform configuration register.

In the present embodiment, the preset enclave may store the following contents: executable code and/or data.

In the present embodiment, the preset enclave may be a designated enclave among various enclaves in the electronic device. The designated enclave is for subsequent remote attestation based on the trusted platform module and local attestation of other enclaves. As an example, the data stored in the preset enclave may not be sensitive data (e.g., privacy data or keys, etc.), or the operations corresponding to the executable code stored in the preset enclave may not involve operations on sensitive data.

Here, the running environment resulting from trusted launching of the device in step 201 is trustworthy; therefore, loading the preset enclave after trusted launching of the device is loading the preset enclave in a trusted running environment, such that the loaded preset enclave is also trustworthy.

In some optional implementations of the present embodiment, when the trusted launch measurement in step 201 comprises a boot loader measurement and a kernel measurement, and the step 201 comprises loading and executing the kernel boot loader and extending the boot loader measurement to the platform configuration register of the trusted platform module, loading and launching the kernel of the operating system installed in the device based on the kernel boot loader and extending the kernel measurement to the platform configuration register, the step 202 may be loading the preset enclave based on the kernel and extending the enclave measurement to the platform configuration register. In other words, loading the preset enclave is the first operation after kernel being launched. Specifically, it may be set in the kernel to take the loading the preset enclave as the first operation after launching of the kernel, or load the preset enclave through an init process. Specific operation steps are provided below:

(1) using a sysvinit system as a launching system. A working principle of the sysvinit system is sequentially launching programs, so as to guarantee that the operation of loading the preset enclave is executed before other operations.

(2) storing data of the to-be-loaded preset enclave to the folder /etc/init.d/.

(3) creating a connection of loading the preset enclave within each run level, and setting a launch number of the created connection to be the smallest among the same running level (i.e., launch in priority), e.g., it may be set to 00.

(4) setting launch numbers corresponding to loading a device driver module (e.g., network driver) and other power-on launching services to be greater than the launch number of the connection of loading the preset enclave. In this way, these operations will be executed after loading the preset enclave.

In some optional implementations of the present embodiment, the electronic device may be further configured with an IOMMU (Input/Output Memory Management Unit), such that based on the above optional implementations, after loading and launching the kernel of the operating system installed in the device based on the kernel boot loader and extending the kernel measurement to the platform configuration register, and before loading the preset enclave based on the kernel and extending the enclave measurement to the platform configuration register, the IOMMU may be set based on the kernel to forbid a DMA (Direct Memory Access) operation; in this way, a DMA attack may be defended from breaking the trusted launching of the electronic device.

In some optional implementations of the present embodiment, after loading the preset enclave based on the kernel and extending the enclave measurement to the platform configuration register, and before step 203, the kernel module of the operating system may be loaded and launched based on the kernel and a kernel module measurement may be extended to the platform configuration register, wherein the kernel module measurement is an integrity measurement of the kernel module. Here, the kernel module is some code that may be loaded and executed by the kernel of the operating system when needed, and the kernel module may be uninstalled by the operating system when it is not needed. The kernel module extends the functions of the kernel of the operating system without a need of rebooting the operating system. As an example, the kernel module may be a device driver (e.g., network device driver) module.

Step 203: initiating a remote attestation of the preset enclave to the authentication server based on the trusted platform module.

In the present embodiment, through the step 201 and the step 202, the platform configuration register of the trusted platform module has stored the trusted launch measurement and the enclave measurement; therefore, a remote attestation of the preset enclave may be initiated to the authentication server based on the trusted platform module, namely, the trusted launch measurement and the enclave measurement stored in the platform configuration register of the trusted platform module may be sent to the authentication server. After receiving the trusted launch measurement and the enclave measurement, the authentication server determines whether the trusted launch measurement and the enclave measurement match a pre-stored trusted launch measurement reference value and a pre-stored enclave reference value, respectively, and in the case of determining that they match respectively, sends remote attestation pass information to the device, wherein the remote attestation pass information is for indicating that the remote attestation of the preset enclave passes.

Step 204: in response to receiving the remote attestation pass information from the authentication server, detecting an operation of loading another enclave.

In the present embodiment, after receiving the remote attestation pass information sent from the authentication server, which indicated that the remote attestation of the preset enclave has passed, the electronic device may detect whether an operation of loading another enclave exists, wherein the another enclave is an enclave different from the preset enclave among the enclaves of the device.

Step 205: in response to the operation of loading the another enclave being detected, performing local attestation of the another enclave based on the preset enclave.

In the present embodiment, because it has been determined in step 203 that the preset enclave remote attestation passes, in the case that the operation of loading the another enclave is detected, the electronic device may perform local attestation of the another enclave based on the preset enclave that has already passed the remote attestation.

It needs to be noted that an approach of performing local attestation of another enclave based on an enclave that has passed remote attestation is prior art that has been widely studied and applied currently, which will not be detailed here.

Continue to refer to FIGS. 4A-4D, which are schematic diagrams of an application scenario for the method of launching a device according to the present embodiment.

Figure 4A:
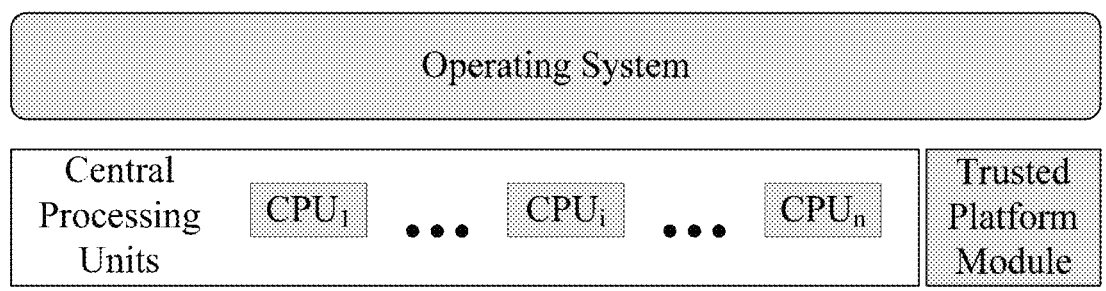
FIGS. 4A-4D are a schematic diagram of an application scenario of a method for launching a device according to the present disclosure.

FIG. 4A shows that after trusted launching the electronic device, the running environment of the electronic device comprises n CPUs, a trusted platform module, and an operating system, wherein the n CPUs, the trusted platform module, and the operating system are all trusted.

Figure 4B:
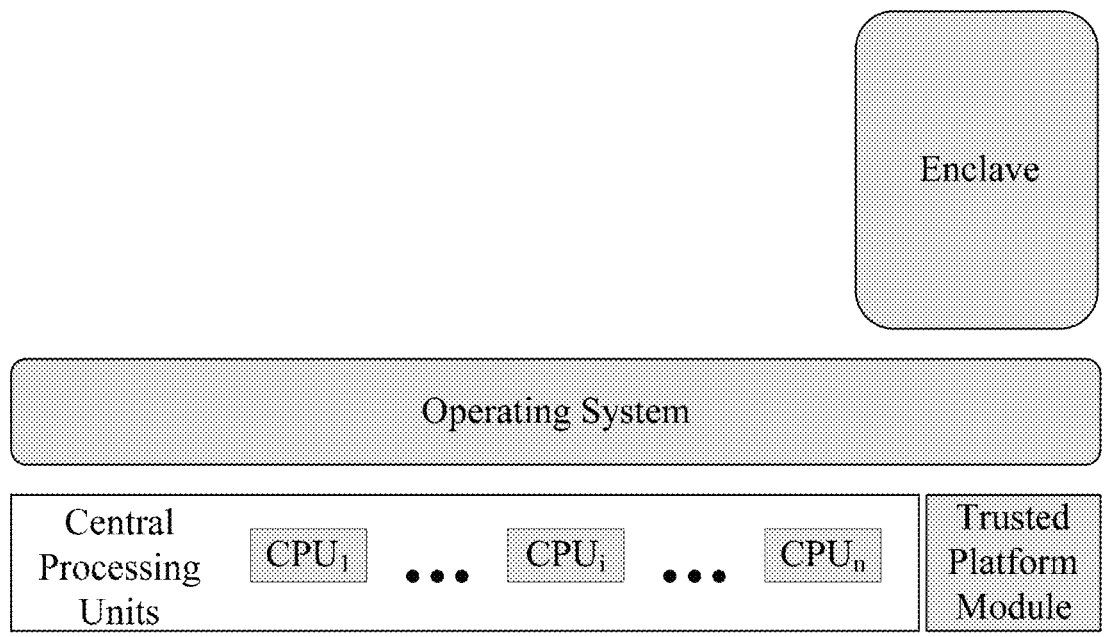

FIG. 4B shows that after loading the preset enclave, the running environment of the electronic device comprises n CPUs, a trusted platform module, an operating system, and a preset enclave, wherein the n CPUs, the trusted platform module, the operating system, and the preset enclave are all trusted.

Figure 4C:
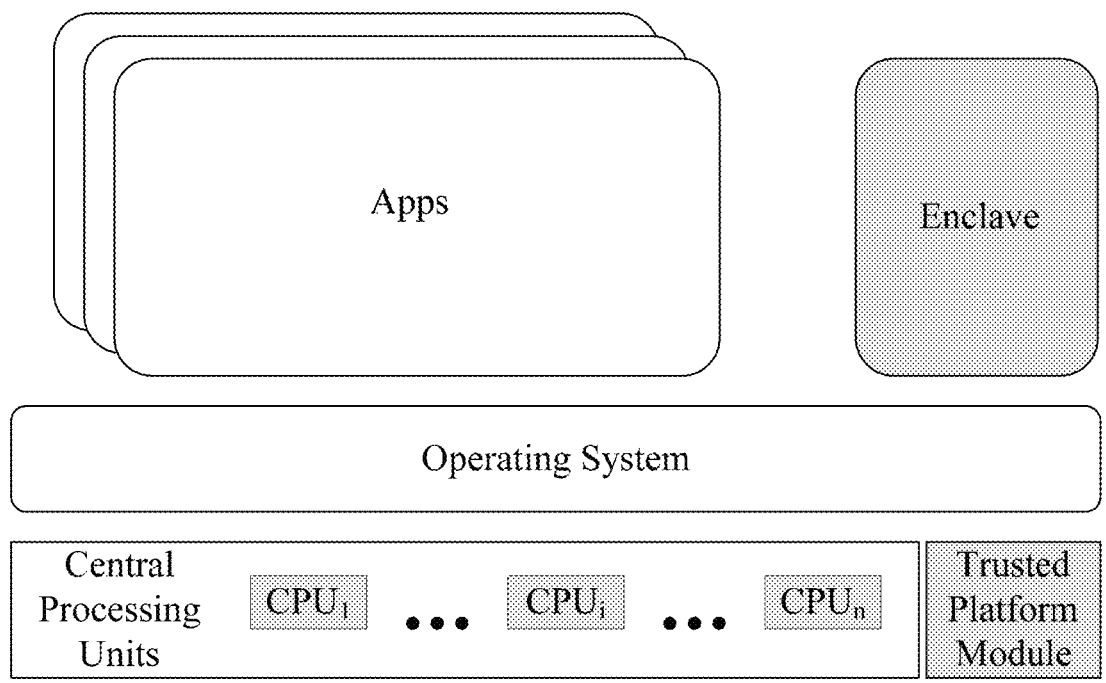

FIG. 4C shows that after initiating a remote attestation of the preset enclave to the authentication server based on the trusted platform module and receiving remote attestation pass information sent from the authentication server, the running environment of the electronic device comprises n CPUs, a trusted platform module, an operating system, a plurality of applications, and a preset enclave, wherein the n CPUs, the trusted platform module, and the preset enclave are trusted, while the operating system is not trusted any more, nor are the plurality of applications.

Figure 4D:
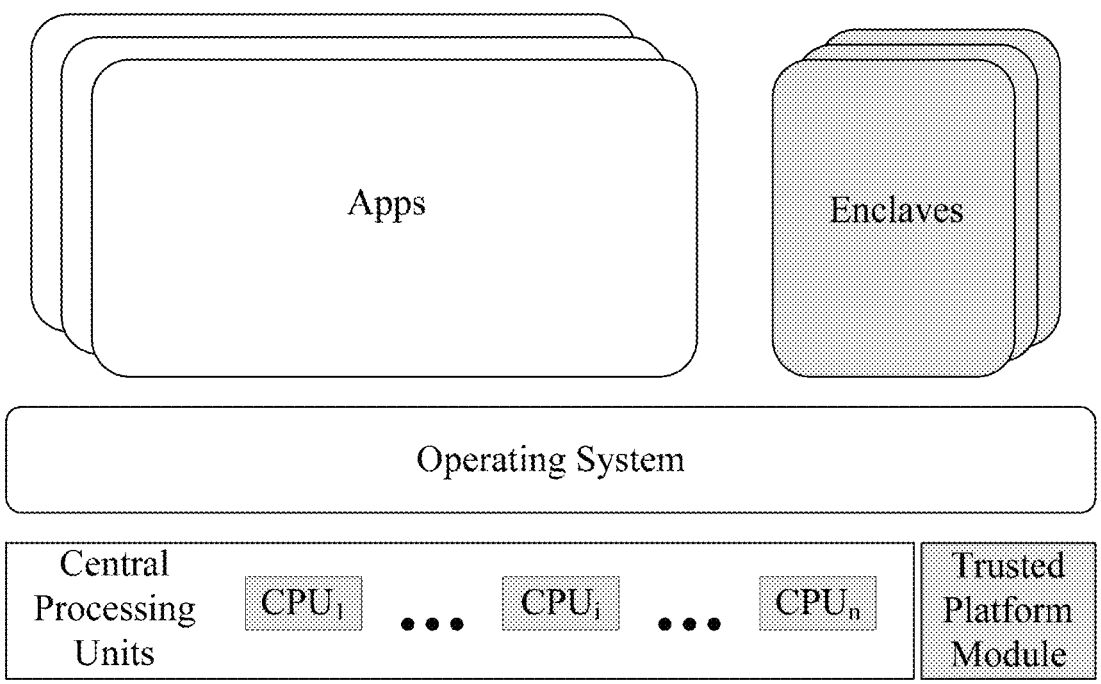

FIG. 4D shows that after the operation of loading another enclave is detected and the local attestation of a plurality of other enclaves passes, the running environment of the electronic device comprises n CPUs, a trusted platform module, an operating system, a plurality of applications, and a plurality of trusted enclaves, wherein the plurality of trusted enclaves comprise the preset enclave and the other enclaves having passed the local attestation based on the preset enclave, wherein the n CPUs, the trusted platform module, and the plurality of trusted enclaves are trusted, while the operating system and the plurality of applications are not trusted.

With the method for launching a device provided by the embodiments of the present disclosure, by creating a trusted running environment through trusted launching the device, before the operating system launches other services, the first enclave is securely launched first and subjected to a TPM-based remote attestation. In this way, even the operating system and other running environments are hacked later, the first launched enclave is still attested, and the remote attestation of subsequent enclaves may be finalized through the first enclave performing local attestation of the subsequent enclaves. Due to adopting the TPM-based remote attestation instead of the Intel SGX-based remote attestation, the remote attestation process of the present disclosure will have a high security, independent of remote attestation infrastructure of the Intel SGX; in addition, most electronic devices are provided with a trusted platform module, independent of new hardware functions, such that the remote attestation process has a universality.

Figure 5:
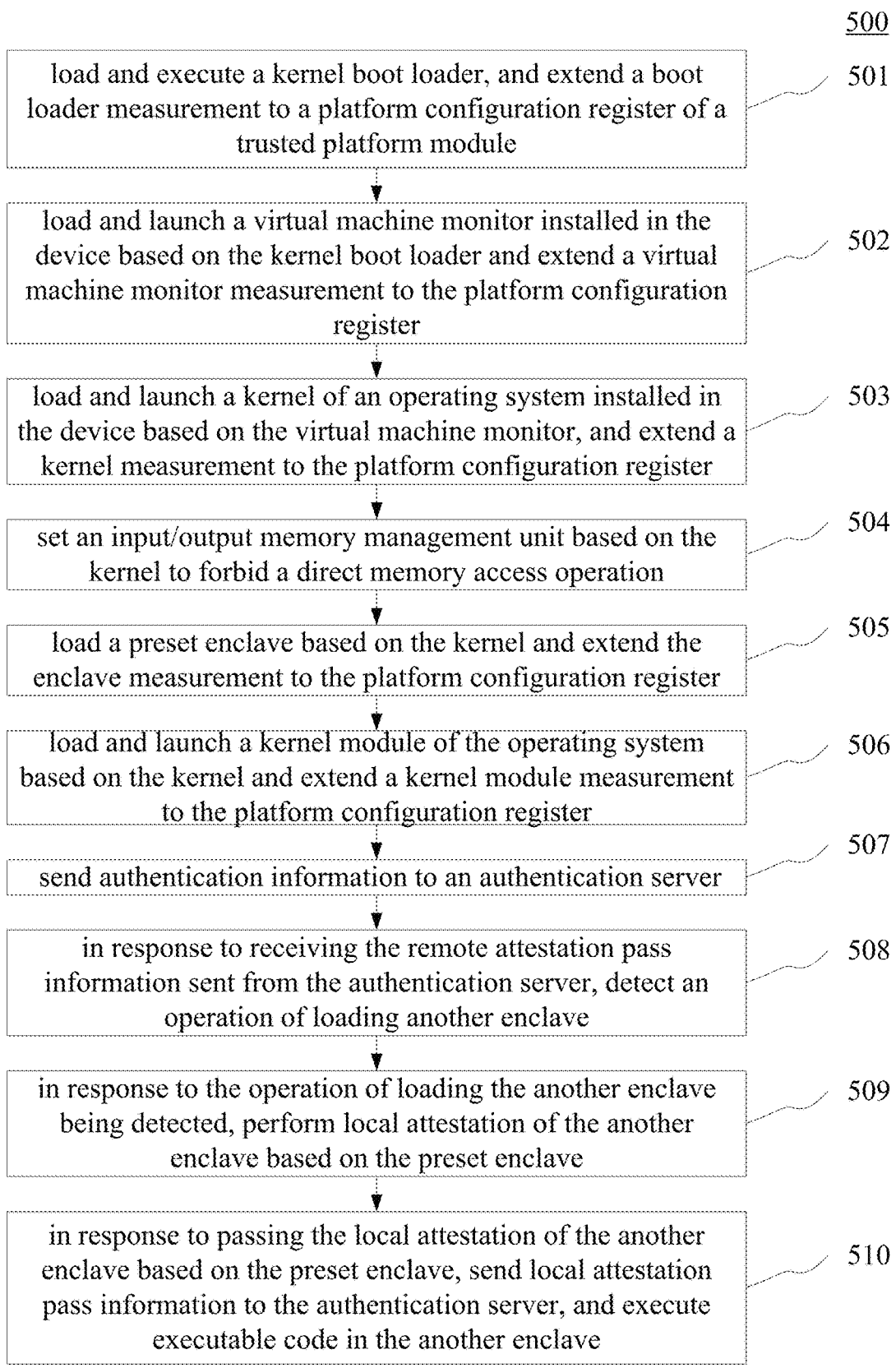
FIG. 5 is a flow diagram of another embodiment of a method for launching a device according to the present disclosure.

Further refer to FIG. 5, which shows a flow 500 of another embodiment of the method for launching a device. the flow 500 of the method for launching a device comprises steps of:

Step 501: loading and executing a kernel boot loader, and extending a boot loader measurement to a platform configuration register of a trusted platform module.

In the present embodiment, an electronic device (e.g., the electronic device 101 shown in FIG. 1) on which the method for launching a device runs may, after power-on of the electronic device, load and execute the kernel boot loader, and extend a boot loader measurement to a platform configuration register of the trusted platform module, wherein the boot loader measurement is an integrity measurement of the kernel boot loader.

Here, the electronic device may support an Intel SGX technology and be provided with a trusted platform module, wherein the trusted platform module refers to a TPM security chip in compliance with TPM (Trusted Platform Module) standards. The TPM security chip may implement functions such as integrity measurement, encrypted storage of sensitive data, remote attestation, authorized access to internal resources, and encrypted transmission of data, etc. The specific description of the TPM security chip may refer to relevant content in the embodiment shown in FIG. 3, which will not be detailed here.

In the present embodiment, the kernel boot loader may be used to first boot a virtual machine monitor installed in the electronic device and then boot the kernel of the operating system installed in the electronic device.

Step 502: loading and launching a virtual machine monitor installed in the device based on the kernel boot loader and extending a virtual machine monitor measurement to the platform configuration register.

In the present embodiment, the electronic device may load and launch the virtual machine monitor installed in the device based on the kernel boot loader loaded and launched in the step 501, and extend a virtual machine monitor measurement to the platform configuration register, wherein the virtual machine monitor measurement is an integrity measurement of the virtual machine monitor.

In the present embodiment, the virtual machine monitor (e.g., Hypervisor) installed in the electronic device may support an enclave local attestation across virtual machines.

Step 503: loading and launching a kernel of an operating system installed in the device based on the virtual machine monitor, and extending a kernel measurement to the platform configuration register.

In the present embodiment, the electronic device may load and launch the kernel of the operating system installed in the device based on the virtual machine monitor loaded and launched in the step 502 and extend the kernel measurement to the platform configuration register, wherein the kernel measurement is an integrity measurement of the kernel.

Step 504: setting an input/output memory management unit based on the kernel to forbid a direct memory access operation.

In the present embodiment, the electronic device may be provided with an input/output memory management unit. In this way, the input/output memory management unit may be set to forbid a direct memory access operation based on the kernel of the operating system loaded and launched in the step 503. Forbidding the direct memory access operation may defend a direct memory access attack from breaking the trusted launching of the electronic device.

Step 505: loading a preset enclave based on the kernel and extending the enclave measurement to the platform configuration register.

In the present embodiment, the electronic device may load a preset enclave based on the kernel of the operating system loaded and launched in step 503, and extend an enclave measurement to the platform configuration register.

Step 506: loading and launching a kernel module of the operating system based on the kernel and extending a kernel module measurement to the platform configuration register.

In the present embodiment, after loading the preset enclave, the electronic device may load and launch a kernel module of the operating system based on the kernel of the operating system loaded and launched in the step 503, and extend a kernel module measurement to the platform configuration register, wherein the kernel module measurement is an integrity measurement of the kernel module.

Step 507: sending authentication information to an authentication server.

In the present embodiment, the electronic device may send the authentication information to the authentication server. Here, the authentication information may include: a trusted launch measurement and an enclave measurement, wherein the trusted launch measurement may include a boot loader measurement, a virtual machine monitor measurement, a kernel measurement, and a kernel module measurement. After receiving the authentication information, the authentication server may determine whether the received authentication information matches a pre-stored reference authentication information, and send remote attestation pass information to the device in the case of determining a match, wherein the remote attestation pass information is for indicating that the remote attestation of the preset enclave passes.

In some optional implementations of the present embodiment, the trusted platform module provided in the electronic device may be provided with a module identifier, e.g., an endorsement key or an attestation identity of the trusted platform module may be adopted as the module identifier of the trusted platform module. In this way, the authentication information may also comprise the module identifier of the trusted platform module.

Step 508: in response to receiving the remote attestation pass information sent from the authentication server, detecting an operation of loading another enclave.

In the present embodiment, the specific operation of step 508 is substantially identical to that of step 204 in the embodiment shown in FIG. 2, which will not be detailed here.

Step 509: in response to the operation of loading the another enclave being detected, performing local attestation of the another enclave based on the preset enclave.

In the present embodiment, the specific operation of the step 509 is substantially identical to that of step 205 in the embodiment shown in FIG. 2, which will not be detailed here.

Step 510: in response to passing the local attestation of the another enclave based on the preset enclave, sending local attestation pass information to the authentication server, and executing executable code in the another enclave.

In the present embodiment, in the case of passing the local attestation of the another enclave based on the preset enclave in step 509, the electronic device may send local attestation pass information to the authentication server and execute the executable code in the another enclave, wherein the local attestation pass information is for indicating that the local attestation of the another enclave based on the preset enclave passes. In this way, after receiving the local attestation pass information, the authentication server may determine that the remote attestation of the another enclave passes, and then the another enclave may interact with the authentication server.

It may be seen from FIG. 5 that compared with the embodiment corresponding to FIG. 2, the flow 500 of the method for launching a device in the present embodiment highlights the specific steps of trusted launching the device when the virtual machine monitor installed in the device supports the enclave local attestation across virtual machines. Therefore, the solution as described in the present embodiment may run in a virtualized environment.

Figure 6:
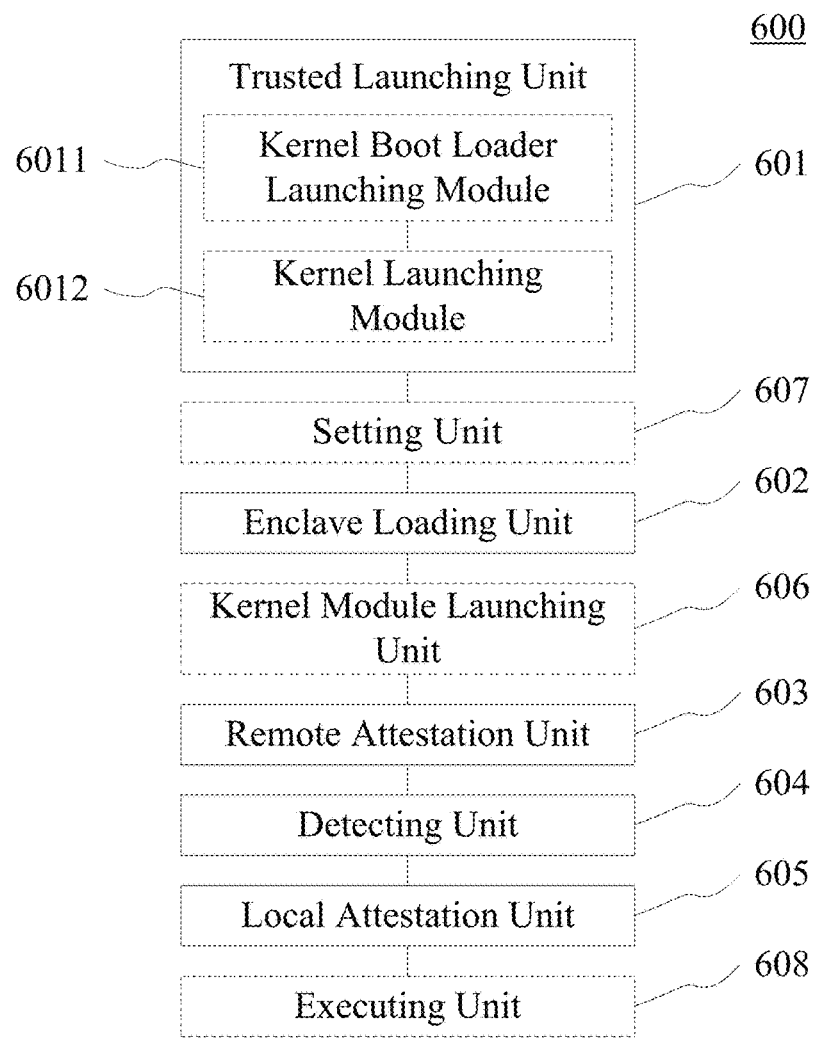
FIG. 6 is a structural schematic diagram of an embodiment of an apparatus for launching a device according to the present disclosure.

Continue to refer to FIG. 6, to implement the methods shown in the respective drawings above, the present disclosure provides an embodiment of an apparatus for launching a device, the device being provided with a trusted platform module. The apparatus embodiment corresponds to the method embodiment shown in FIG. 2, and the apparatus may be specifically applied to various electronic devices.

As shown in FIG. 6, the apparatus 600 for launching a device according to the present disclosure comprises: a trusted launching unit 601, an enclave loading unit 602, a remote attestation unit 603, a detecting unit 604, and a local attestation unit 605. Particularly, the trusted launching unit 601 is configured to trusted launch the device and extend a trusted launch measurement to a platform configuration register of the trusted platform module, wherein the trusted launch measurement is an integrity measurement of the trusted launching of the device; the enclave loading unit 602 is configured to load a preset enclave and extend an enclave measurement to the platform configuration register, wherein the enclave measurement is an integrity measurement of the preset enclave; the remote attestation unit 603 is configured to initiate a remote attestation of the preset enclave to an authentication server based on the trusted platform module; the detecting unit 604 is configured to in response to receiving remote attestation pass information sent from the authenticating server, detect an operation of loading another enclave, wherein the another enclave is an enclave different from the preset enclave among enclaves of the device; and the local attestation unit 605 is configured to in response to the operation of loading the another enclave being detected, perform local attestation of the another enclave based on the preset enclave.

In the present embodiment, specific processing of the trusted launching unit 601, the enclave loading unit 602, the remote attestation unit 603, the detecting unit 604, and the local attestation unit 605 of the apparatus for launching a device and the technical effects brought thereby may refer to relevant illustrations of step 201, step 202, step 203, step 204, and step 205 in the embodiments corresponding to FIG. 2, respectively, which will not be detailed here.

In some optional implementations of the present embodiment, the trusted launch measurement may include a boot loader measurement and a kernel measurement; and the trusted launching unit 601 may comprise: a kernel boot loader launching module 6011 configured to load and execute a kernel boot loader and extend the boot loader measurement to the platform configuration register of the trusted platform module, wherein the boot loader measurement is an integrity measurement of the kernel boot loader; and a kernel launching module 6012 configured to load and launch a kernel of the operating system installed in the device based on the kernel boot loader and extend the kernel measurement to the platform configuration register, wherein the kernel measurement is an integrity measurement of the kernel. The specific processing of the kernel boot loader launching module 6011 and the kernel launching module 6012 and the technical effects brought thereby may refer to relevant illustrations of step 201 in the embodiment corresponding to FIG. 2, which will not be detailed here.

In some optional implementations of the present embodiment, the enclave loading unit 602 may be further configured to: load the preset enclave based on the kernel and extend the enclave measurement to the platform configuration register. The specific processing of the enclave loading unit 602 and the technical effects brought thereby may refer to relevant illustrations of step 202 in the embodiment corresponding to FIG. 2, which will not be detailed here.

In some optional implementations of the present embodiment, the apparatus 600 may further comprise: a kernel module launching unit 606 configured to: load and launch a kernel module of the operating system based on the kernel and extend a kernel module measurement to the platform configuration register, wherein the kernel module measurement is an integrity measurement of the kernel module. The specific processing of the kernel module launching unit 606 and the technical effects brought thereby may refer to relevant illustrations of step 506 in the embodiment corresponding to FIG. 5, which will not be detailed here.

In some optional implementations of the present embodiment, the trusted platform module is provided with a module identifier; and the remote attestation unit 603 may be further configured to: send authentication information to the authentication server, wherein the authentication server performs the remote attestation of the preset enclave based on the received authentication information, the authentication information including: the module identifier of the trusted platform module, the trusted launch measurement, and the enclave measurement. The specific processing of the remote attestation unit 603 and the technical effects brought thereby may refer to relevant illustrations of step 507 in the embodiment corresponding to FIG. 5, which will not be detailed here.

In some optional implementations of the present embodiment, the device is further provided with an input/output memory management unit; and the apparatus 600 may further comprise: a setting unit 607 configured to set the input/output memory management unit based on the kernel to forbid a direct memory access operation. The specific processing of the setting unit 607 and the technical effects brought thereby may refer to relevant illustrations of step 504 in the embodiment corresponding to FIG. 5, which will not be detailed here.

In some optional implementations of the present embodiment, the trusted launch measurement may further include a virtual machine monitor measurement; and the kernel boot loader launching module 6011 may be further configured to: load and launch a virtual machine monitor installed in the device based on the kernel boot loader and extend the virtual machine monitor measurement to the platform configuration register, wherein the virtual machine monitor measurement is an integrity measurement of the virtual machine monitor; and load and launch the kernel of the operating system installed in the device based on the virtual machine monitor and extend the kernel measurement to the platform configuration register. The specific processing of the kernel boot loader launching module 6011 and the technical effects brought thereby may refer to relevant illustrations of step 502 and step 503 in the embodiment corresponding to FIG. 5, which will not be detailed here.

In some optional implementations of the present embodiment, the apparatus 600 may further comprise: an executing unit 608 configured to in response to passing the local attestation of the another enclave based on the preset enclave, send local attestation pass information to the authentication server, and execute executable code in the another enclave, wherein the authentication server determines that the remote attestation of the another enclave passes in response to receiving the local attestation pass information. The specific processing of the executing unit 608 and the technical effects brought thereby may refer to relevant illustrations of step 510 in the embodiment corresponding to FIG. 5, which will not be detailed here.

Hereinafter, refer to FIG. 7, which shows a structural schematic diagram of a computer system 700 of an electronic device adapted to implement the embodiments of the present disclosure. The electronic device shown in FIG. 7 is only an example, which should not bring about any limitation to the function or scope of use of the embodiments of the present disclosure.

Figure 7:
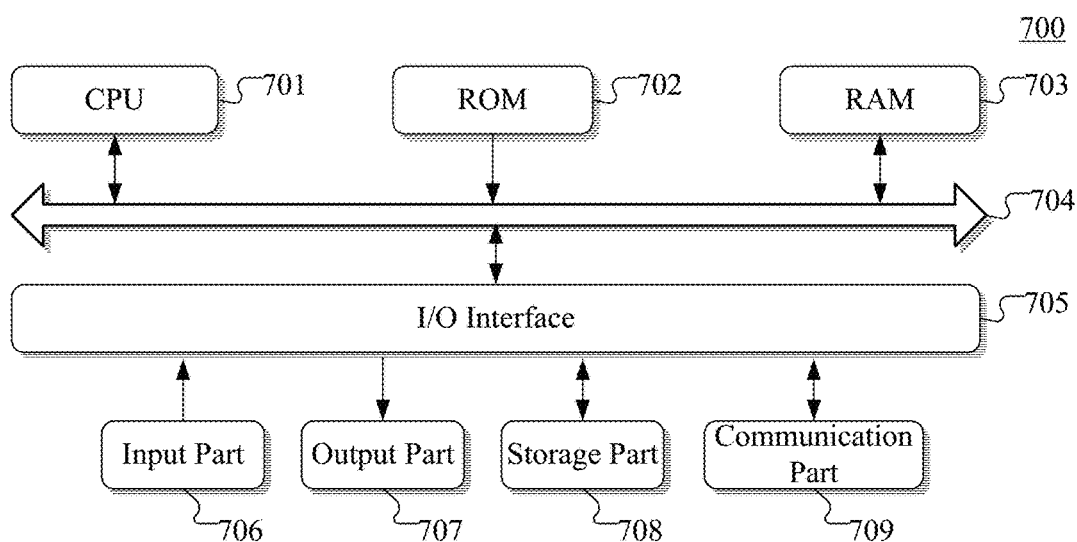
FIG. 7 is a structural schematic diagram of a computer system of an electronic device adapted for implementing embodiments of the present disclosure.

As shown in FIG. 7, the computer system 700 comprises a central processing unit (CPU) 701 which may perform various kinds of appropriate actions and processing according to computer program stored in a read-only memory (ROM) 702 or computer program loaded into the random-access memory (RAM) 703 from a memory part 708. In RAM 703, there may also store various kinds of programs and data needed for operations of the system 700. CPU 701, ROM 702, and RAM 703 are connected with each other via a bus 704. The input/output (I/O) interface 705 may also be connected to the bus 704.

A plurality of components are connected to the I/O interface 705, comprising: an input part 706 including a keyboard, a mouse, and etc.; an output part 707 including such as a CRT (Cathode Ray Tube), an LCD (Liquid Crystal Display), and a loudspeaker, etc.; a memory part 708 including a hard disk, etc.; and a communication part 709 including a network interface card such as a LAN (Local Area Network) card, a modem, etc. The communication part 709 performs communication processing via a network such as the Internet.

Particularly, according to the embodiments of the present disclosure, the processes described above with reference to the flow charts may be implemented as computer software programs. For example, an embodiment of the present disclosure includes a computer program product that has a computer program embodied on a computer-readable medium, the computer program containing computer codes for executing the method shown in the flow chart. In such an embodiment, the computer programs may be downloaded and installed from a network through the communication part 709. When being executed by the central processing unit (CPU) 701, the computer programs execute the functions limited in the method of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program code are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device. The program code embodied on the computer-readable medium may be transmitted using any appropriate medium, including, but not limited to: wireless, wired, cable, RF, etc., or any appropriate combination thereof.

The flow charts and block diagrams in the drawings illustrate system architectures, functions, and operations possibly implemented by the system, method, and computer program product of various embodiments of the present disclosure. At this point, each block in the flow charts or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks actually may be executed substantially in parallel, and they may be sometimes executed in a reverse order, dependent on the functions involved. It should also be noted that each block in the block diagrams and/or flow charts and a combination of blocks in the block diagrams and/or flow diagrams may be implemented by a specific hardware-based system for executing a prescribed function or operation, or may be implemented by a combination of specific hardware and computer instructions.

The units mentioned in the description of the embodiments of the present disclosure may be implemented in a software manner or in a hardware manner. The described units may be disposed in a processor, for example may be described as: a processor comprising a trusted launching unit, an enclave loading unit, a remote attestation unit, a detecting unit, and a local attestation unit. Particularly, names of these units do not constitute limitations to those units. For example, the detecting unit may also be described as "a unit that detects an operation of loading other enclaves."

In another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: trusted launch the device and extend a trusted launch measurement to a platform configuration register of the trusted platform module, wherein the trusted launch measurement is an integrity measurement of the trusted launching of the device; load a preset enclave and extend an enclave measurement to the platform configuration register, wherein the enclave measurement is an integrity measurement of the preset enclave; initiate a remote attestation of the preset enclave to an authentication server based on the trusted platform module; in response to receiving remote attestation pass information sent from the authenticating server, detect an operation of loading another enclave, wherein the another enclave is an enclave different from the preset enclave among enclaves of the device; in response to the operation of loading the another enclave being detected, perform local attestation of the another enclave based on the preset enclave.

What have been described above are only preferred embodiments of the present disclosure and an illustration of the technical principle as exerted. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for launching a device configured with a trusted platform module, comprising:
   trusted launching the device and extending a trusted launch measurement to a platform configuration register of the trusted platform module, wherein the trusted launch measurement is an integrity measurement of the trusted launching of the device;
   loading a preset enclave and extending an enclave measurement to the platform configuration register, wherein the enclave measurement is an integrity measurement of the preset enclave;
   initiating a remote attestation of the preset enclave to an authentication server based on the trusted platform module;
   in response to receiving remote attestation pass information sent from the authenticating server, detecting an operation of loading another enclave, wherein the another enclave is an enclave different from the preset enclave among enclaves of the device; and
   in response to the operation of loading the another enclave being detected, performing local attestation of the another enclave based on the preset enclave.

2. The method according to claim 1, wherein the trusted launch measurement includes a boot loader measurement and a kernel measurement;
   and wherein the trusted launching the device and extending a trusted launch measurement to a platform configuration register of the trusted platform module comprises:
   loading and executing a kernel boot loader, and extending the boot loader measurement to the platform configuration register of the trusted platform module, wherein the boot loader measurement is an integrity measurement of the kernel boot loader; and
   loading and launching a kernel of an operating system installed in the device based on the kernel boot loader, and extending the kernel measurement to the platform configuration register, wherein the kernel measurement is an integrity measurement of the kernel.

3. The method according to claim 2, wherein the loading a preset enclave and extending an enclave measurement to the platform configuration register comprises:
   loading the preset enclave based on the kernel and extending the enclave measurement to the platform configuration register.

4. The method according to claim 3, further comprising, after loading the preset enclave based on the kernel and extending the enclave measurement to the platform configuration register,
   loading and launching a kernel module of the operating system based on the kernel and extending a kernel module measurement to the platform configuration register, wherein the kernel module measurement is an integrity measurement of the kernel module.

5. The method according to claim 4, wherein the trusted platform module is provided with a module identifier; and wherein the initiating a remote attestation of the preset enclave to an authentication server based on the trusted platform module comprises:
   sending authentication information to the authentication server, wherein the authentication server performs the remote attestation of the preset enclave based on the received authentication information, the authentication information including: the module identifier of the trusted platform module, the trusted launch measurement, and the enclave measurement.

6. The method according to claim 5, wherein the method comprises, before loading the preset enclave based on the kernel and extending the enclave measurement to the platform configuration register,
   setting the device based on the kernel to forbid a direct memory access operation.

7. The method according to claim 6, wherein the trusted launch measurement further includes a virtual machine monitor measurement; and wherein the loading and launching a kernel of an operating system installed in the device based on the kernel boot loader and extending the kernel measurement to the platform configuration register comprises:
   loading and launching a virtual machine monitor installed in the device based on the kernel boot loader, and extending the virtual machine monitor measurement to the platform configuration register, wherein the virtual machine monitor measurement is an integrity measurement of the virtual machine monitor; and
   loading and launching the kernel of the operating system installed in the device based on the virtual machine monitor and extending the kernel measurement to the platform configuration register.

8. The method according to claim 7, further comprising:
   in response to passing the local attestation of the another enclave based on the preset enclave, sending local attestation pass information to the authentication server, and executing executable code in the another enclave, wherein the authentication server determines that the remote attestation of the another enclave passes in response to receiving the local attestation pass information.

9. An apparatus for launching a device configured with a trusted platform module, comprising:
   at least one processor; and
   a memory storing instructions, wherein the instructions when executed by the at least one processor, cause the at least one processor to perform operations, the operations comprising:
   trusted launching the device and extending a trusted launch measurement to a platform configuration register of the trusted platform module, wherein the trusted launch measurement is an integrity measurement of the trusted launching of the device;
   loading a preset enclave and extend an enclave measurement to the platform configuration register, wherein the enclave measurement is an integrity measurement of the preset enclave;
   initiating a remote attestation of the preset enclave to an authentication server based on the trusted platform module;
   in response to receiving remote attestation pass information sent from the authenticating server, detecting an operation of loading another enclave, wherein the another enclave is an enclave different from the preset enclave among enclaves of the device; and
   in response to the operation of loading the another enclave being detected, performing local attestation of the another enclave based on the preset enclave.

10. The apparatus according to claim 9, wherein the trusted launch measurement includes a boot loader measurement and a kernel measurement; and wherein the trusted launching the device and extending a trusted launch measurement to a platform configuration register of the trusted platform module comprises:

loading and executing a kernel boot loader and extending the boot loader measurement to the platform configuration register of the trusted platform module, wherein the boot loader measurement is an integrity measurement of the kernel boot loader; and loading and launching a kernel of the operating system installed in the device based on the kernel boot loader and extending the kernel measurement to the platform configuration register, wherein the kernel measurement is an integrity measurement of the kernel.

11. The apparatus according to claim 10, wherein the loading a preset enclave and extending an enclave measurement to the platform configuration register comprises:

loading the preset enclave based on the kernel and extending the enclave measurement to the platform configuration register.

12. The apparatus according to claim 11, wherein the operations further comprise:

loading and launching a kernel module of the operating system based on the kernel and extending a kernel module measurement to the platform configuration register, wherein the kernel module measurement is an integrity measurement of the kernel module.

13. The apparatus according to claim 12, wherein the trusted platform module is provided with a module identifier; and wherein the initiating a remote attestation of the preset enclave to an authentication server based on the trusted platform module comprises:

sending authentication information to the authentication server, wherein the authentication server performs the remote attestation of the preset enclave based on the received authentication information, the authentication information including: the module identifier of the trusted platform module, the trusted launch measurement, and the enclave measurement.

14. The apparatus according to claim 13, wherein the operations further comprise:

setting the device based on the kernel to forbid a direct memory access operation.

15. The apparatus according to claim 14, wherein the trusted launch measurement further includes a virtual machine monitor measurement; and wherein the loading and launching a kernel of an operating system installed in the device based on the kernel boot loader and extending the kernel measurement to the platform configuration register comprises:

loading and launching a virtual machine monitor installed in the device based on the kernel boot loader and extending the virtual machine monitor measurement to the platform configuration register, wherein the virtual machine monitor measurement is an integrity measurement of the virtual machine monitor; and loading and launching the kernel of the operating system installed in the device based on the virtual machine monitor and extending the kernel measurement to the platform configuration register.

16. The apparatus according to claim 15, wherein the operations further comprise:

in response to passing the local attestation of the another enclave based on the preset enclave, sending local attestation pass information to the authentication server, and executing executable code in the another enclave, wherein the authentication server determines that the remote attestation of the another enclave passes in response to receiving the local attestation pass information.

17. A non-transitory computer readable storage medium having a computer program embodied thereon, wherein the computer program, when being executed by a processor, causes the processor to:

trusted launch a device and extend a trusted launch measurement to a platform configuration register of a trusted platform module, wherein the trusted launch measurement is an integrity measurement of the trusted launching of the device;

load a preset enclave and extend an enclave measurement to the platform configuration register, wherein the enclave measurement is an integrity measurement of the preset enclave;

initiate a remote attestation of the preset enclave to an authentication server based on the trusted platform module;

in response to receiving remote attestation pass information sent from the authenticating server, detect an operation of loading another enclave, wherein the another enclave is an enclave different from the preset enclave among enclaves of the device; and in response to the operation of loading the another enclave being detected, perform local attestation of the another enclave based on the preset enclave.

\* \* \* \* \*